Jan. 23, 1962 R. J. FARRELLY 3,018,449
ELECTRONIC COMMUTATOR
Filed Nov. 25, 1959 4 Sheets-Sheet 1
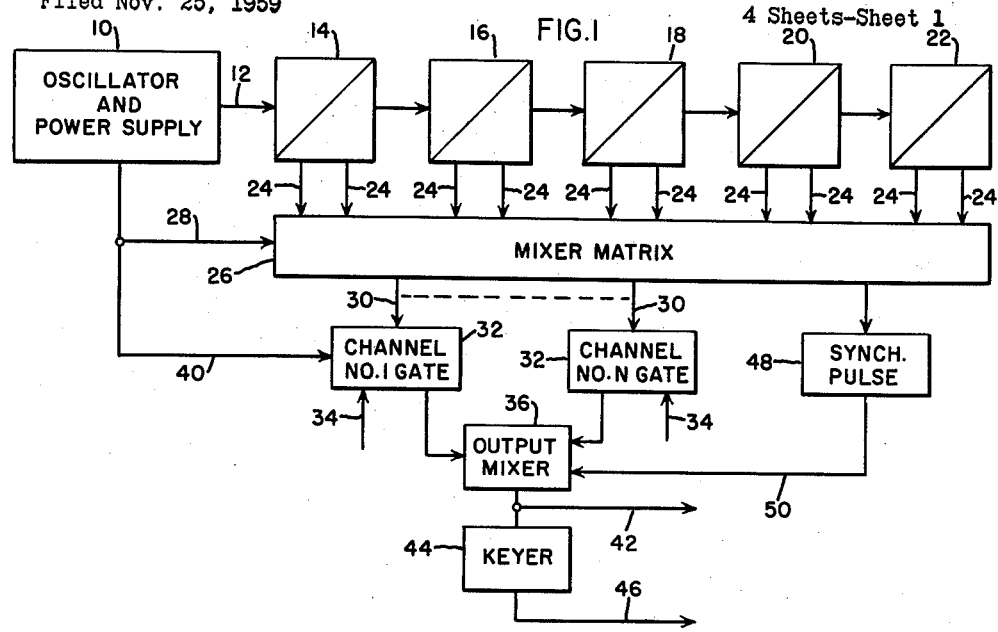
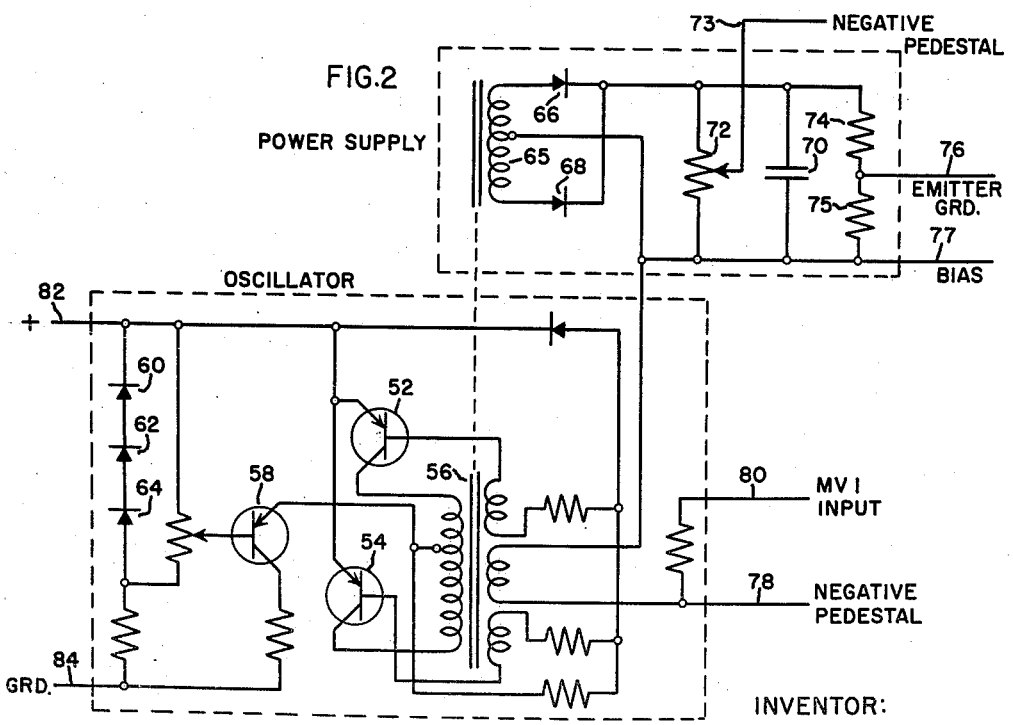
INVENTOR:
RICHARD J. FARRELLY,
BY T. E. Kristofferson
HIS ATTORNEY.

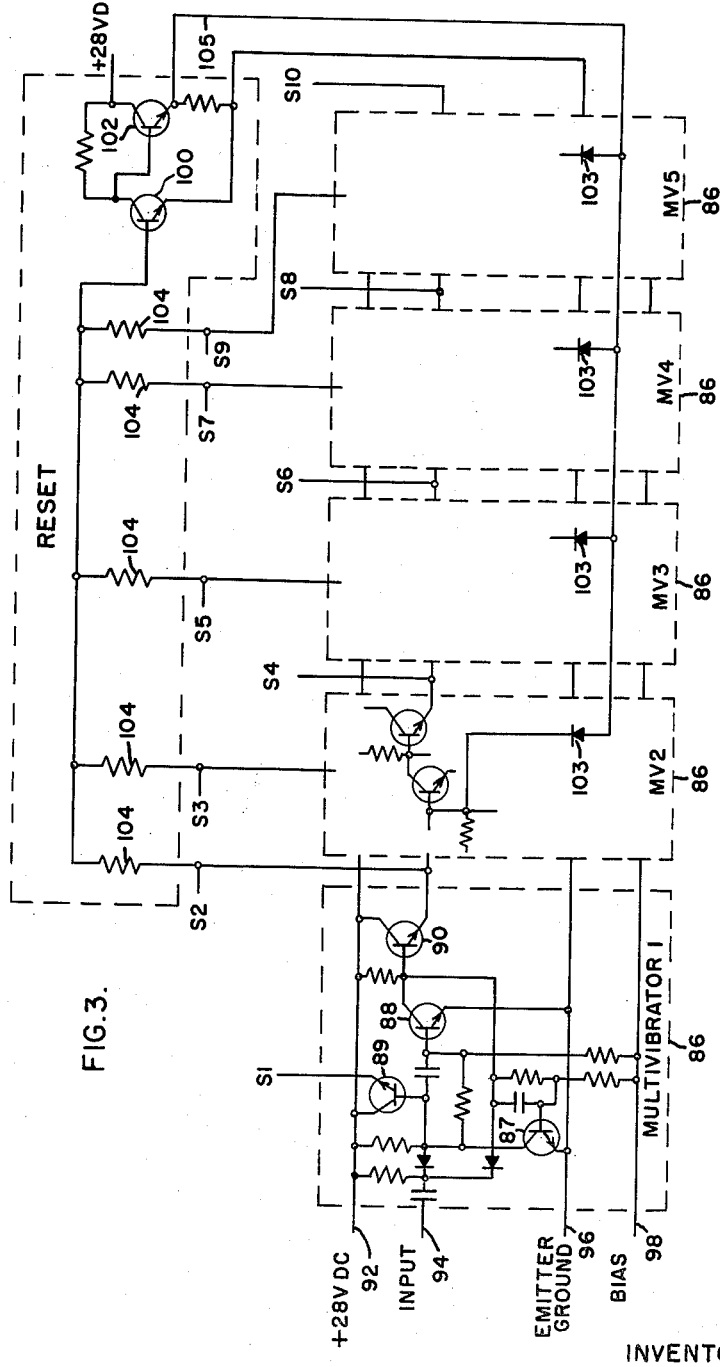

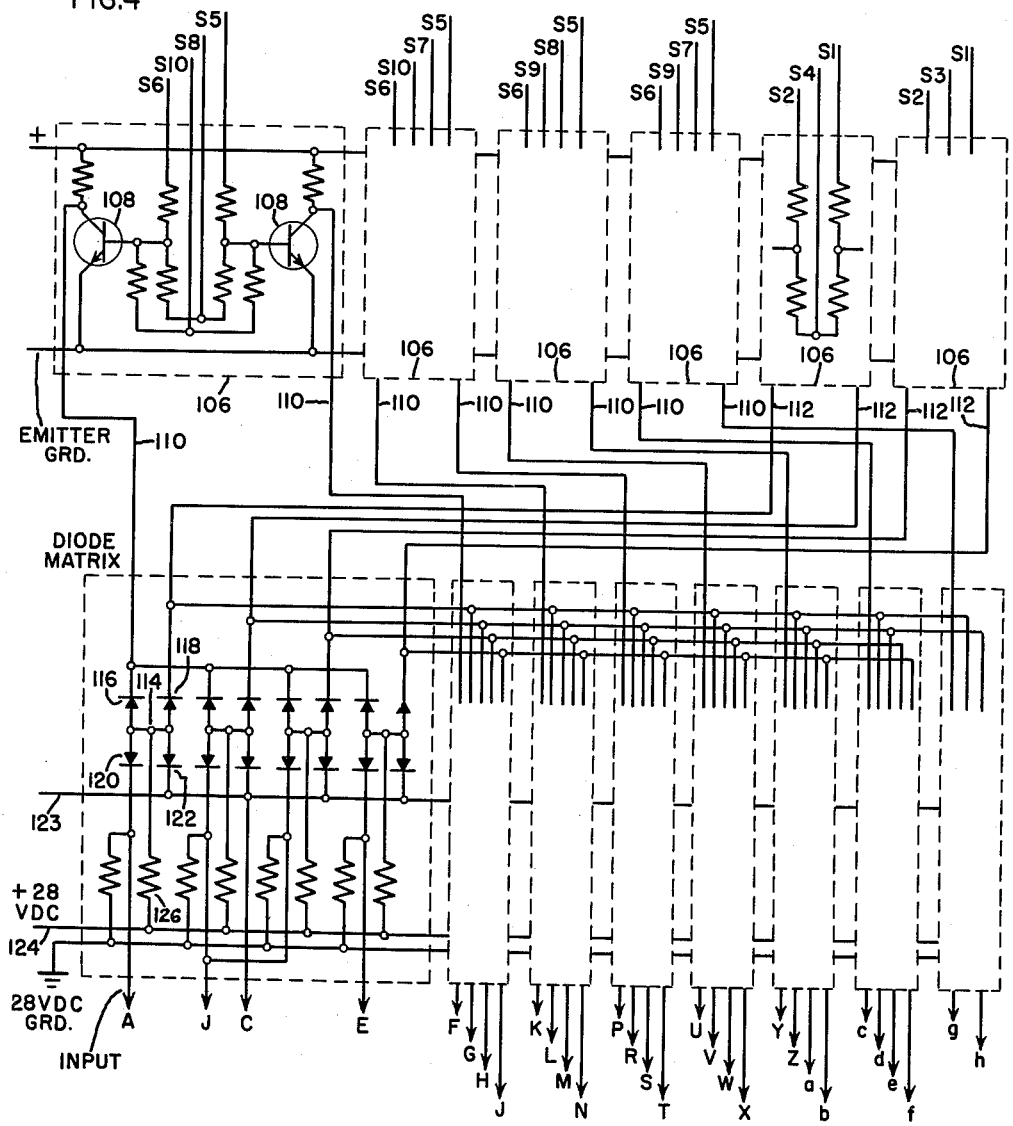

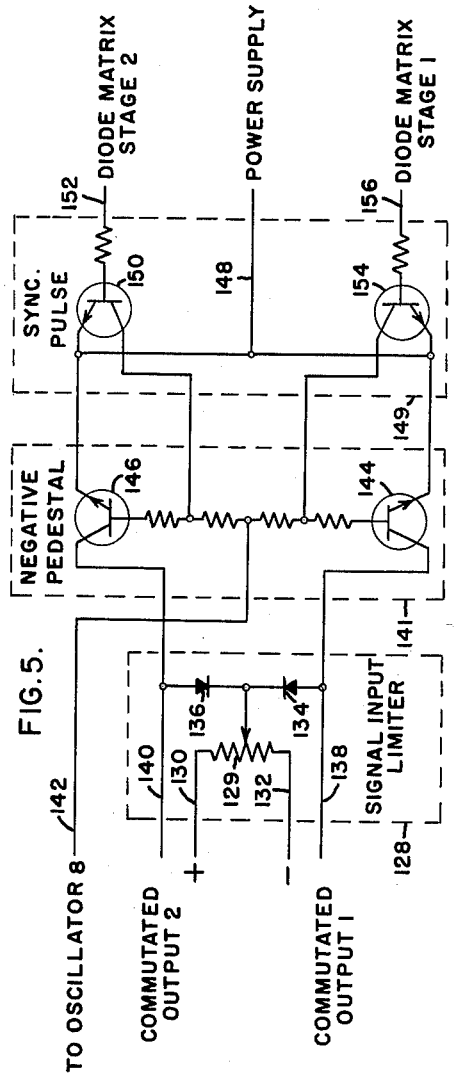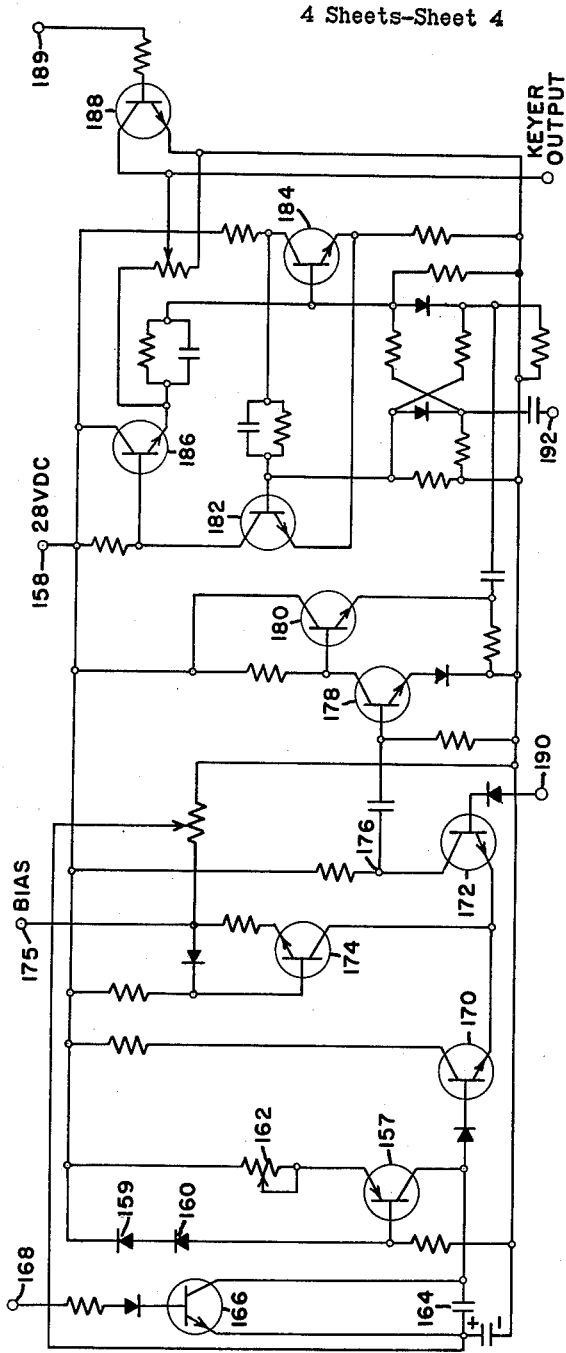

United States Patent Office 3,018,449
Patented Jan. 23, 1962

3,018,449
ELECTRONIC COMMUTATOR
Richard J. Farrelly, Riverton, N.J., assignor to General Electric Company, a corporation of New York
Filed Nov. 25, 1959, Ser. No. 855,291
10 Claims. (Cl. 332—1)

This invention relates to electronic switching circuitry and more particularly to an electronic commutator for use in a multiplex telemetry system.

Prior art commutation devices have in the main been mechanical or electro-mechanical. The essentially mechanical nature of such a switching process results in continual wear and therefore a limited life for an electro-mechanical commutator. Also, the performance will deteriorate continuously with time so that even during the effective operating life there will be changes in commutator characteristics. Effective speed control is difficult to provide in an electro-mechanical device without resorting to centrifugally governed D.C. motors or A.C. synchronous motors operated from a frequency controlled source. Governed D.C. motors have proven to be noisy and unreliable. The inherent complexity of frequency controlled A.C. power sources limits their usefulness in air-borne applications. In addition to this, electromechanical commutators are sensitive to acceleration, shock and vibration. In order to overcome these difficulties and to provide a commutator which would be serviceable for air-borne telemetry applications it is an object of the invention to remove all moving mechanical parts from such a commutator.

Another object of the invention is to provide an electronic commutator for sequentially connecting a group of input channels to a common output channel at a constant rate and in a definite predetermined sequence.

Still another object is to provide an electronic commutator which is relatively insensitive to acceleration, shock and vibration.

A further object of the invention is to provide a commutator the performance of which will not deteriorate continuously with time.

A still further object of the invention is to provide a commutator which is smaller and lighter in weight than its corresponding mechanical counterpart.

A still further object of the invention is to provide a commutator which requires less power than the corresponding mechanical unit and which can operate, for example, from the 28 volt D.C. voltage normally provided in air-borne applications.

A still further object of the invention is to apply binary counting logic methods to telemetry multiplexing.

In carrying out the invention in one form thereof, a transistorized combined oscillator and power supply provides clock pulses to a number of cascade connected transistorized multi-vibrators. The outputs of the multi-vibrators are connected to a diode mixer-matrix which channels the multi-vibrator outputs to actuate gating circuitry in a sequential manner for a number of communication channels. Each state of the multi-vibrator chain is indicative of one of the communication channels and gates its associated channel on through the mixer circuitry. In the event that the number of channels for data transmission is less the total number of counts to return the multi-vibrator chain to its initial condition, the multi-vibrator chain may be reset to its initial state by appropriate circuitry after data from the last channel has been transmitted. The channel gates in turn are connected to a common output mixer to provide a common output for the series of communication channel inputs to the electronic commutator. A synchronizing pulse source is driven by the matrix to provide frame information to the mixer. In addition the output mixer may be connected to a keyer to provide a keyer output of pulses of constant amplitude and variable width from the commutator pulses of constant width and variable amplitude, to provide an output which is less susceptible to system noise in the manner of frequency modulation.

The novel features which are believed to be characteristic of the invention are set forth with particularity in the appended claims. The invention itself, however, together with further objects and advantages thereof, can best be understood by reference to the following description taken in connection with the accompanying drawings in which—

FIG. 1 is a block diagram of an electronic commutator in accordance with the invention;

FIG. 2 is a schematic diagram of the oscillator and power supply of the circuit of FIG. 1;

FIG. 3 is a diagram, partly in schematic and partly in repetitive block form, of the multi-vibrator chain of the circuit of FIG. 1;

FIG. 4 is a diagram, again partly in schematic and partly in repetitive block form, of the diode matrix and gating circuitry of the commutator illustrated in FIG. 1;

FIG. 5 is a schematic diagram of portions of the synchronizing pulse circuit and the output mixer circuit of the electronic commutator illustrated in FIG. 1; and FIG. 6 is a schematic diagram of the keyer illustrated in block form in the circuit diagram of FIG. 1.

A commutator carries out the process of sequentially connecting a series of inputs to a common output. It is the means employed to sample many data points through a single communications channel. This method of acquiring data is especially applicable to physical measurements where time constants are such as to virtually eliminate instantaneous changes in the value of the variable.

Referring to the drawings, in FIG. 1 there is illustrated such a commutator. Oscillator and power supply 10 provides a series of clock pulses on output lead 12 to a multi-vibrator chain consisting of multivibrators 14, 16, 18, 20 and 22 connected in cascade. Each of these multi-vibrators has two output leads 24. One or the other of the output leads of each of the multi-vibrators has a pulse on it depending upon the state of the multi-vibrator. These output leads 24 are connected to a diode mixer matrix 26 which also receives a bias voltage on lead 28 from oscillator and power supply 10.

The clock pulse input to the multi-vibrator chain causes a count to proceed along the chain in the well-known manner. The chain can count up to $2^n$ pulses before starting over. (Where $n$ is the number of multi-vibrators in the chain.) Each count has a distinctive output on the group of leads 24. This output is mixed in the matrix 26 to provide sequential gating pulses on output leads 30 for sequentially actuating channel gates 32. When each of the channel gates 32 is sequentially actuated, it serves to connect the input terminal 34 associated with the particular channel actuated to a common output mixer 36. A bias voltage may also be provided to each of the channel gates 32 as by lead 40 from oscillator and power supply 10. The output of mixer 36 which appears on lead 42 may also be connected to the input of a keyer 44 which has a separate output on lead 46. The output of keyer 44 consists of pulses of constant amplitude and variable width which are derived from the output pulses of mixer 36 which are of constant width and variable amplitude. These pulses from keyer 44 are less susceptible to system noise in the manner of frequency modulation.

A synchronizing pulse network 48 may also be connected to mixer-matrix 26 to derive a master pulse suitable for synchronizing decommutation equipment. This pulse is fed to mixer 36 over lead 50 to provide frame identification information.

FIG. 2 shows an oscillator and power supply such as may be employed in block 10 of FIG. 1. The oscillator is a class B power oscillator of the magnetically coupled type, such as that developed by Royer, and consists of transistors 52 and 54 which operate in a class B oscillation mode using transformer 56 for switching purposes. Either transistor 52 or transistor 54 is conducting in the frequency rate as determined by the saturation flux density of transformer 56. Transistor 58 is an emitter follower type voltage regulator used to provide constant voltage to the oscillator. It has as reference Zener diodes 60, 62 and 64, which are connected in series to provide the necessary voltage level. This is a voltage controlled oscillator where the output frequency is proportional to the input voltage. In order to maintain the input voltage within acceptable limits, the voltage is supplied from the transistorized voltage regulator of the emitter follower type with the Zener diode reference source. One winding of this oscillator is rectified in the power supply section to provide D.C. voltages for bias and reference purposes. One output winding 65 of transformer 56 contains a full wave rectifier consisting of rectifier diodes 66 and 68 connected in the conventional full wave circuit. This voltage which has very low ripple content is filtered by capacitor 70. However, switching transients necessarily occur during the reversal of polarity which is essential to the operation of transformer 56. Since the occurrence of these is synchronized with the stepping of the commutator from one channel to the next, as will appear more clearly from the description hereinafter, the electrical noise which they constitute does not interfere with the transmission of desired signals, which takes place at other times. Potentiometer 72 is connected across this D.C. voltage in order to provide a negative pedestal voltage on lead 73. A voltage divider network 74, 75 across this negative voltage provided by the power supply is used to provide an emitter ground voltage which appears on lead 76. The negative voltage on lead 77 is the bias voltage necessary to turn off the transistors operating in the bi-stable multi-vibrator mode in multi-vibrators 14, 16, 18, 20 and 22 of FIG. 1. Lead 78 from the oscillator circuitry provides negative pedestal timing. Lead 80 from the oscillator is the clock pulse for the entire system and is fed into the first of the string of multi-vibrators, multi-vibrator 14 of FIG. 1. Both the oscillator and the power supply shown in FIG. 2 are powered from 28 volts D.C. which is supplied on lead 82 as positive terminal and lead 84 as a ground terminal. FIG. 3 contains five multi-vibrators 86 which are standard bi-stable multi-vibrators of the Eccles-Jordan type which are inherently capable of dividing frequency. They contain feed-back circuitry necessary to reset them to a count less than their natural count, which for five stages is $2^5$ or 32. Each of the multi-vibrators 86 contains two transistors 87 and 88 which are R.C. coupled to provide the regeneration necessary to give multi-vibrator action. Transistors 89 and 90 are emitter follower buffer amplifiers connected across the output of the multi-vibrator to provide the buffering necessary to operate the logic circuitry. Considering the first multi-vibrator 86, this multi-vibrator has as input the following leads: lead 92 carries the 28 volt D.C. power source, lead 94 carries the clock pulse or output of the oscillator shown on lead 80 in FIG. 2, lead 96 carries the negative voltage known as emitter ground which is derived from the power supply, lead 76 of FIG. 2, and lead 98 carries the bias which is the negative voltage derived from the power supply, lead 77 of FIG. 2.

The reset circuitry which is used to make multi-vibrators 86 count to 30, for example, rather than 32 contains two transistors, transistor 100 which is used as an "and" gate to detect the presence of 30 counts, and transistor 102 which is a buffer transistor. This reset circuitry is used to drive a diode, shown typically as 103, connected to the base of the appropriate transistor in a multi-vibrator, to put it in the state corresponding to its initial condition or state 1. Resistors 104 are connected to each multi-vibrator in such a sequence as to provide a pulse over all leads simultaneously at the base of transistor 100 when 30 clock pulses have passed into the multi-vibrator chain. This pulse amplified through transistor 102 which is connected as an emitter follower is used to reset the multi-vibrator chain to its initial state by pulsing diodes 103 over lead 105.

The circuitry shown in FIG. 4 is the mixer-matrix 26 shown in FIG. 1. This matrix is connected to multi-vibrators 86 of FIG. 3 over the leads S1 through S10 indicated in FIGS. 3 and 4. The circuits 106 are transistor "and" gate circuits which are used to mix the outputs of multi-vibrators 86 of FIG. 3 to provide a 4 by 8 matrix arrangement at the foot of transistor gating circuits 106. The outputs of the 4 by 8 matrix can be applied to a system of diode logic to provide as many as 32 distinct outputs or as few distinct outputs as are determined by the reset condition of the multi-vibrators. In the case at hand, a 4 by 8 matrix is connected to provide 30 distinct outputs. Considering the matrix, the 8 portion of the matrix appears on leads 110. The 4 portion of the matrix appears on leads 112. The 110 and the 112 leads are then applied to the diode matrix shown in the lower part of FIG. 4. Sequential voltage necessary to turn on a particular commutator channel in a given sequence can be illustrated by considering node 114. Diodes 116 and 118 are connected in a diode "and" circuit at this node. Diode 116 is connected to one of the leads 110 which are the 8 leads of the 4 by 8 matrix, while diode 118 is connected to one of the leads 112 or the 4 leads of the 4 by 8 matrix.

In a commutator frame one time in 30 there will be a positive pulse on both a particular 8 lead and a 4 lead at only one time per frame. When diodes 116 and 118 have a positive pulse appearing on their input sides, node 114 will assume a positive potential and this is the condition which is necessary to gate a channel input to the common output. Diodes 120 and 122 are part of a typical channel as shown in the channel No. 1 gate 32 of FIG. 1. Node 114 assumes a positive potential because of the necessary pulses existing on the diodes 116 and 118. The input voltage, from a sensor, for example, which appears on the positive side of diode 120 will be transferred to the common output lead 123, which is connected to the positive side of diode 122, by current flow from the 28 volt source 124 down through resistor 126 and diode 122. At all other times, that is when that particular commutator gate is not turned on, the current flow from the 28 volt source 124 down through resistor 126 will be shunted to a negative voltage through either diode 116 or diode 118. In such a condition, both diode 120 and 122 will be back-biased and then there will be no transfer of signal from that particular input to the common output. This is indicative of the operation of a particular channel. The operation of the other channels takes place in a similar fashion.

The limiter section 128 shown in FIG. 5 is part of the output mixer 36 of FIG. 1. The purpose of the limiter circuit is to put a maximum on the voltage which can appear on the commutator output and thereby prevent over-modulation of the transmitter and resultant cross talk. The limiter employs a potentiometer, 129, which is connected across the 28 volt D.C. supply applied to lead 130. The other end of the potentiometer 129 is connected to ground through lead 132. The center tap of the potentiometer 129 is the common point for diodes 134 and 136 which are the voltage limiting diodes. The commutated output appearing on lead 138 is limited by the flow of current from lead 138 through diode 134 and potentiometer 129 to ground lead 132, whenever the voltage on lead 138 exceeds the setting of the potentiometer pickup arm. Similarly, when the voltage on lead 140 exceeds the setting of the potentiometer arm, current flow will take place through diode 136 and potentiometer 129 to ground lead 132. Limiting action is possible in this type of circuit because the commutator outputs are high impedance sources while the potentiometer is a relatively low impedance.

The next part of FIG. 5 to be considered is the negative pedestal 141 which also appears in FIG. 1 as part of the output mixer 36. The purpose of the negative pedestal 141 is to provide a sharp negative signal after each data pulse. Therefore, the negative pedestal will be required to occur 30 times for a 30 channel commutator. The negative pedestal is keyed by a pulse appearing on lead 142 which emanates from the oscillator lead 78 of FIG. 2. Commutator output lead 140 receives its negative pedestal through transistor 146, which is connected as a chopper and which is initiated by the timing pulse appearing on lead 142. Commutator output lead 138 is also chopped to the negative voltage by transistor 144, which also receives its timing signal from lead 142. The absolute value of the negative voltage to which the commutator outputs are chopped is determined by the setting of the power supply and this voltage appears on lead 148 from lead 73 of FIG. 2.

The portion of FIG. 5 which is identified as the synchronization pulse 149 appears in FIG. 1, identified as synchronization pulse 48. The operation of the synchronizing pulse network 149 is basically to disable a negative pedestal between channel 1 and 2. Transistor 150 receives a pulse from the diode matrix on lead 152 coming from the node 114 of FIG. 4 associated with the first channel. This pulse applied to the base of transistor 150 disarms negative pedestal transistor 146 and allows commutator output on lead 140 to pass unchopped to the common output. Synchronization pulse transistor 154 receives a pulse from the diode matrix on lead 156 coming from the node 114 of FIG. 4 associated with the first channel, which disables negative pedestal transistor 144 and enables the commutator output on lead 138 to proceed to the output without chopping.

The keyer 44 of FIG. 1 is shown in FIG. 6. The first element of the keyer to be considered is the constant current source. This constant current source uses an active element, transistor 157. Constant current is maintained by having a constant voltage existing between the 28 volt D.C. supply on lead 158 and transistor 157 base through the use of Zener diodes 159 and 160. Precision potentiometer 162 is connected between the supply voltage lead 158 and the emitter of transistor 157. Thus, the current appearing at the collector of transistor 157 assumes a constant value. Constant current is applied to capacitor 164 so that the voltage across capacitor 164 is a linear function of time. Transistor 166 is used to discharge capacitor 164 when necessary in the timing sequence. Lead 168 which receives its signal from lead 78 of FIG. 2 triggers transistor 166. The next portion of the keyer to be discussed is the comparator circuit which consists of transistors 170 and 172 connected in a differential circuit and transistor 174 connected as a constant current sink to provide high common node rejection. The bias voltage for transistor 174 is provided on lead 175 from lead 77 of FIG. 2. When the voltage at the base of transistor 170 exceeds the voltage at the base of transistor 172, an output pulse will appear at terminal 176. This voltage will be amplified by the pulse amplifier shown as transistors 178 and 180. Transistors 182 and 184 are connected as a gated flip-flop. Transistor 186 is connected as a buffer amplifier on the output of transistor 182 to provide fast rise time by reducing capacitive slow-down of the multi-vibrator output. Transistor 188 is used to provide keyer synchronism. It has an input on lead 189 from a 114 node of FIG. 4 from the appropriate channel. The operation of the keyer is as follows: The output of the commutator, and amplitude varying signal of constant width, is applied to the base of transistor 172 over lead 190. The linear saw-tooth voltage, which is generated within the keyer across capacitor 164 by means of constant current source 157 is applied to the base of transistor 170. When the amplitude of the saw-tooth voltage exceeds the amplitude of the commutator output pulse, a trigger voltage will appear on terminal 176. This trigger output voltage is amplified by transistors 178 and 180 and is applied to multi-vibrator transistor 184. This turns off the multi-vibrator composed of transistors 182 and 184. This flip-flop is turned on at a definite time for each commutator output pole by a clock pulse appearing on lead 192 coming from lead 78 of FIG. 2. Therefore, this flip-flop will turn on at equal time intervals during the commutator output pulse train. The commutator will be turned off in accordance with the amplitude of the pulse appearing on that particular commutator segment or channel. Thus, since the output flip-flop is being turned on at fixed intervals of time and turned off at intervals of time determined by the information appearing on the particular pulse, the output signal appearing on the transistor 186 will have as pulse length a function of the amplitude of the information pulse being applied at that particular period of time.

It will be obvious to those skilled in the art that various modifications of the circuitry employed to implement the embodiment illustrated in FIG. 1 may be made. While a particular embodiment has been discussed, it will be understood that the invention is not limited thereto and that it is contemplated to cover any such modifications as fall within the true spirit and scope of the invention by the appended claims.

What is claimed as new and desired to be secured by Letters Patent of the United States is:

1. In an electronic commutator, a multi-vibrator chain consisting of a plurality of multi-vibrators connected in cascade, a combined oscillator and power supply providing a source of timing pulses connected to the input of said chain, a matrix for providing an output on a separate lead in a given sequence for each count of said chain connected to the outputs of said chain, a plurality of channel gates each having an input, said combined oscillator and power supply being connected to said mixer matrix to provide bias, an output mixer, said separate leads being connected to said channel gates to gate said channel gates on in said sequence and means connecting the outputs of said channel gates to the inputs of said mixer, whereby said channel gates inputs are connected to the output of said mixer in said sequence.

2. In an electronic commutator, a multi-vibrator chain consisting of a plurality of multi-vibrators connected in cascade, a combined oscillator and power supply providing a source of timing pulses connected to the input of said chain, a matrix for providing an output on a separate lead in a given sequence for each count of said chain connected to the outputs of said chain, a reset circuit connected to said chain for returning said multi-vibrators to their initial state after a predetermined count is reached, a plurality of channel gates each having an input, means connecting said oscillator and power supply to supply bias voltages to said matrix, an output mixer, a synchronizing pulse network connected from said mixer matrix to said mixer for providing frame information, said separate leads being connected to said channel gates to gate said channel gates on in said sequence, means connecting the outputs of said channel gates to the inputs of said mixer whereby said channel gate inputs are connected to the output of said mixer in said sequence, and a keyer connected to the output of said mixer for transforming the fixed time variable amplitude output signals from said mixer to a fixed amplitude variable time signal.

3. In an electronic commutator, a multi-vibrator chain consisting of a plurality of multi-vibrators connected in cascade, a combined oscillator and power supply providing a source of timing pulses connected to the input of said chain, a matrix for providing an output on a separate lead in a given sequence for each count of said chain connected to the outputs of said chain, a plurality of channel gates each having an input, said oscillator and power supply supplying bias voltages to said matrix, an output mixer, a synchronizing pulse network connected from said mixer matrix to said mixer for providing frame information, said separate leads being connected to said channel gates to gate said channel gates on in sequence, means connecting the outputs of said channel gates to the inputs of said mixer whereby said channel gate inputs are connected to the output of said mixer in said sequence, and a keyer connected to the output of said mixer for transforming the fixed time variable amplitude output signals from said mixer to a fixed amplitude variable time signal.

4. In an electronic commutator, a multi-vibrator chain consisting of a plurality of multi-vibrators connected in cascade, a combined oscillator and power supply providing a source of timing pulses connected to the input of said chain, a matrix for providing an output on a separate lead in a given sequence for each count of said chain connected to the outputs of said chain, a plurality of channel gates each having an input, said oscillator and power supply supplying bias voltages to said matrix, an output mixer, a synchronizing pulse network connected to said matrix having an output connected to said mixer for providing frame information thereto, said separate leads being connected to said channel gates to gate said channel gates on in said sequence and means connecting the outputs of said channel gates to the inputs of said mixer, whereby said channel gate inputs are connected to the output of said mixer and said sequence.

5. In an electronic commutator, a multi-vibrator chain consisting of a plurality of multi-vibrators connected in cascade, a combined oscillator and power supply providing a source of timing pulses connected to the input of said chain, a matrix for providing an output on a separate lead in a given sequence for each count of said chain connected to the outputs of said chain, a reset circuit connected to said chain for returning said multi-vibrators to their initial state after a predetermined count is reached, a plurality of channel gates each having an input, said oscillator and power supply supplying bias voltages to said matrix, an output mixer, said separate leads being connected to said channel gates to gate said channel gates on in said sequence, means connecting the outputs of said channel gates to the inputs of said mixer whereby said channel gate inputs are connected to the output of said mixer in said sequence, and a keyer connected to the output of said mixer for transforming the fixed time variable amplitude output signals from said mixer to a fixed amplitude variable time signal.

6. In an electronic commutator, a multi-vibrator chain consisting of a plurality of multi-vibrators connected in cascade, a combined oscillator and power supply providing a source of timing pulses connected to the input of said chain, a matrix for providing an output on a separate lead in a given sequence for each count of said chain connected to the output of said chain, a reset circuit connected to said chain for returning said multi-vibrators to their initial state after a predetermined count is reached, a plurality of channel gates each having an input, said oscillator and power supply supplying bias voltages to said matrix, an output mixer, said separate leads being connected to said channel gates to gate said channel gates on in said sequence, and means connecting the outputs of said channel gates to the inputs of said mixer whereby said channel gate inputs are connected to the output of said mixer in said sequence.

7. In an electronic commutator, a multi-vibrator chain consisting of a plurality of multi-vibrators connected in cascade, a combined oscillator and power supply providing a source of timing pulses connected to the input of said chain, a matrix for providing an output on a separate lead in a given sequence for each count of said chain connected to the outputs of said chain, a plurality of channel gates each having an input, said oscillator and power supply supplying bias voltages to said matrix, an output mixer, said separate leads being connected to said channel gates to gate said channel gates on in said sequence, means connecting the outputs of said channel gates to the inputs of said mixer whereby said channel gate inputs are connected to the output of said mixer in said sequence, and a keyer connected to the output of said mixer for transforming the fixed time variable amplitude output signals from said mixer to a fixed amplitude variable time signal.

8. In a commutating switching system comprising a source of timing pulses, a plurality of input channels, at least one output channel, gating means operable by sequential gating signals to connect the said input channels in succession to the said output channel, sequencing means responsive to the said timing pulses to provide the said sequential gating signals to operate the said gating means, and a source of unidirectional biasing voltage to bias the said sequencing means: the improvement which comprises alternating voltage means added to said source of timing pulses to provide alternating voltage synchronous and locked in phase with said source of timing pulses, and rectifying means to rectify said alternating voltage to provide said unidirectional biasing voltage.

9. In a commutating switching system comprising an oscillator, which includes a transformer, to furnish timing pulses, a plurality of input channels, at least one output channel, gating means operable by sequential gating signals to connect the said input channels in succession to the said output channel, sequencing means responsive to said timing pulses to operatively provide the said sequential gating signals to the said gating means, and a source of unidirectional biasing voltage to bias the said sequencing means; the improvement which comprises a winding on said transformer to furnish alternating voltage, and rectifying means to rectify said alternating voltage to provide said unidirectional biasing voltage.

10. In a commutating switching system which comprises a magnetically coupled class B oscillator as a source of timing pulses, a plurality of input channels, at least one output channel, a plurality of gates operable by sequential gating signals to connect the said input channels in succession to the said output channel, sequencing means responsive to the said timing pulses to operatively provide to the said gates the said sequential gating signals, and a source of unidirectional biasing voltage to bias the said sequencing means: the improvement which comprises a winding magnetically coupled to the said magnetically coupled class B oscillator to furnish alternating voltage, and rectifying means to rectify the said alternating voltage to provide the said unidirectional biasing voltage.

References Cited in the file of this patent

UNITED STATES PATENTS

| | | |
|---|---|---|
| 2,799,727 | Segerstrom | July 16, 1957 |
| 2,928,900 | Pawley | Mar. 15, 1960 |
| 2,950,446 | Humez et al. | Aug. 23, 1960 |